(12) United States Patent
Koeneman et al.

(10) Patent No.: US 11,888,188 B2
(45) Date of Patent: Jan. 30, 2024

(54) FUEL CARTRIDGE HAVING FUEL BEDS WITH SPACE FOR COOLANT FLUID

(71) Applicant: Honeywell International Inc., Morris Plains, NJ (US)

(72) Inventors: Paul Bryant Koeneman, Minnetonka, MN (US); Jeffrey Michael Klein, Minneapolis, MN (US); Steven J. Eickhoff, Brooklyn Park, MN (US); Gustav Rustan, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 645 days.

(21) Appl. No.: 16/354,060

(22) Filed: Mar. 14, 2019

(65) Prior Publication Data

US 2020/0295387 A1  Sep. 17, 2020

(51) Int. Cl.
*H01M 8/04082* (2016.01)
*C01B 3/06* (2006.01)

(52) U.S. Cl.
CPC ......... *H01M 8/04208* (2013.01); *C01B 3/065* (2013.01); *H01M 8/04216* (2013.01)

(58) Field of Classification Search
CPC .......... H01M 8/04208; H01M 8/04216; C01B 3/065
USPC ........................................ 429/408, 415, 421
See application file for complete search history.

(56) References Cited

U.S. PATENT DOCUMENTS

| | | | |
|---|---|---|---|
| 5,202,195 A * | 4/1993 | Stedman | H01M 8/065 429/413 |
| 6,277,509 B1 | 8/2001 | Wheeler | |
| 8,347,645 B1 | 1/2013 | Miller | |
| 2002/0150803 A1 | 10/2002 | Yang | |
| 2004/0126643 A1 * | 7/2004 | Kinkelaar | H01M 8/04208 429/410 |
| 2006/0014059 A1 | 1/2006 | Wood | |
| 2006/0059778 A1 * | 3/2006 | Shurtleff | H01M 8/04208 48/61 |
| 2010/0219087 A1 * | 9/2010 | Fujita | H01M 8/04208 206/0.7 |
| 2011/0129745 A1 * | 6/2011 | Givens | H01M 8/04738 429/423 |

(Continued)

FOREIGN PATENT DOCUMENTS

| | | | |
|---|---|---|---|
| CN | 206799162 U | * | 12/2017 |
| JP | 2017133624 A | * | 8/2017 |

OTHER PUBLICATIONS

"Bed." Merriam-Webster.com Dictionary, Merriam-Webster, https://www.merriam-webster.com/dictionary/bed. Accessed Jul. 19, 2021. (Year: 2021).*

(Continued)

*Primary Examiner* — Sean P Cullen
(74) *Attorney, Agent, or Firm* — Schwegman Lundberg & Woessner, P.A.

(57) ABSTRACT

A fuel cartridge includes an inlet manifold and a plurality of fuel beds containing a hydride material. A first end of each of the fuel beds is coupled to the inlet manifold to receive wet hydrogen via the inlet manifold. An outlet manifold is coupled to a second end of each of the fuel beds to receive dry hydrogen from the fuel beds. The fuel beds are laterally spaced from each other providing space for flow of coolant fluid therebetween. Valves may be included in the inlet and outlet manifolds.

19 Claims, 10 Drawing Sheets

(56) References Cited

U.S. PATENT DOCUMENTS

| | | | |
|---|---|---|---|
| 2013/0108940 A1* | 5/2013 | Langan | C01B 3/0084 |
| | | | 429/426 |
| 2015/0236364 A1* | 8/2015 | Noda | H01M 8/186 |
| | | | 429/418 |
| 2018/0277860 A1* | 9/2018 | Eickhoff | H01M 8/2457 |
| 2020/0295389 A1 | 9/2020 | Klein et al. | |

OTHER PUBLICATIONS

"U.S. Appl. No. 16/353,985, Non Final Office Action dated Sep. 30, 2020", 12 pgs.

"U.S. Appl. No. 16/353,985, Response filed Sep. 17, 2020 to Restriction Requirement dated Jul. 17, 2020", 7 pgs.

"European Application Serial No. 20161662.0, Extended European Search Report dated Nov. 18, 2020", 10 pgs.

"European Application Serial No. 20161662.0, Partial European Search Report dated Aug. 18, 2020", 12 pgs.

\* cited by examiner

FUEL CARTRIDGE HAVING FUEL BEDS WITH SPACE FOR COOLANT FLUID

BACKGROUND

Hydrogen gas has many industrial uses. For example, hydrogen gas can be used in chemical synthesis, as a forming gas, in fuel cells, for energy storage, and/or for applications calling for buoyancy. Previous approaches for utilizing hydrogen gas may involve storing compressed hydrogen gas in a storage tank. Such approaches may be limited in certain contexts by bulk and/or weight.

DETAILED DESCRIPTION

Figure 1:
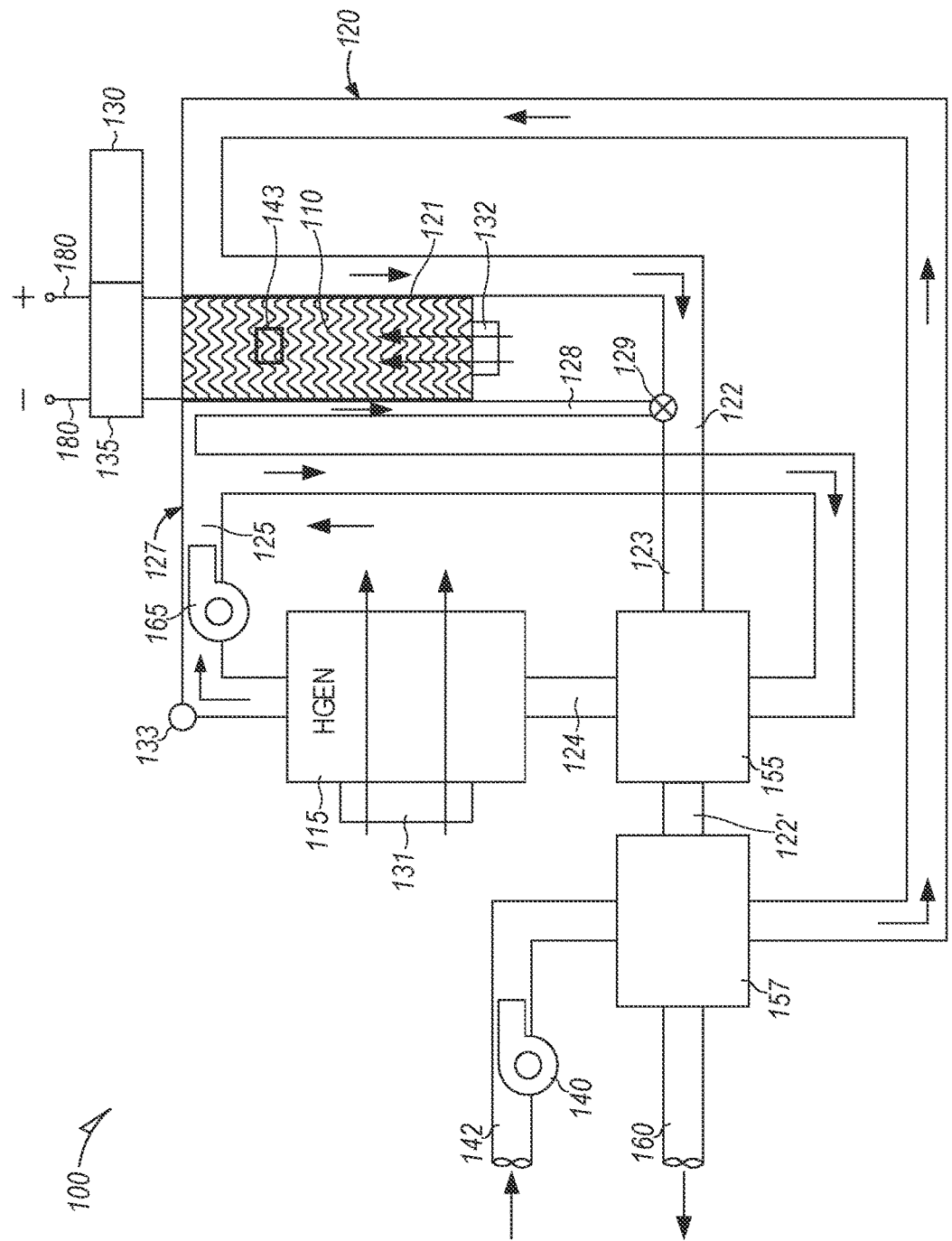
FIG. 1 illustrates a fuel cell based power generator incorporating a fuel cartridge in accordance with one or more embodiments of the present disclosure.

Devices and methods for providing a fuel cartridge are disclosed. One fuel cartridge includes an inlet valve, a plurality of fuel beds containing a hydride material, and an outlet valve, wherein each of the plurality of fuel beds is coupled to the inlet valve via an inlet manifold and wherein each of the plurality of fuel beds is coupled to the outlet valve via an outlet manifold.

An alternative fuel cartridge includes an inlet manifold and a plurality of fuel beds containing a hydride material. A first end of each of the fuel beds is coupled to the inlet manifold to receive wet hydrogen via the inlet manifold. An outlet manifold is coupled to a second end of each of the fuel beds to receive dry hydrogen from the fuel beds. The fuel beds are laterally spaced from each other providing space for flow of coolant fluid therebetween. Valves may be included in the inlet and outlet manifolds.

A method includes containing a granular hydride material and an inert gas in a plurality of parallel fuel beds of a fuel cartridge, passing water vapor from a first end of each of the plurality of fuel beds through a second end of each of the plurality of fuel beds, wherein hydrogen gas is generated by a respective reaction within each of the plurality of fuel beds, and passing the generated hydrogen gas, the inert gas, and a portion of the water vapor out of the fuel cartridge.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in some embodiments. The software may consist of computer executable instructions stored on computer readable media or computer readable storage device such as one or more non-transitory memories or other type of hardware based storage devices, either local or networked.

Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Embodiments of the present disclosure include fuel cartridges. Fuel cartridges in accordance with embodiments of the present disclosure can produce hydrogen gas. Hydrogen gas produced by one or more embodiments herein can be used in chemical synthesis, as a forming gas, for energy storage, and/or for applications calling for buoyancy, among other uses. Such a cartridge is sometimes herein discussed as being configured for use in the example of powering an unmanned air system (UAS). It is noted, however, that such discussion is provided for example purposes and that embodiments of the present disclosure are not so limited.

Embodiments of the present disclosure can be a part of a fuel cell based power generator system. In the example of a UAS, such a fuel cell based power generator system can be capable of, for instance, providing 4-12 times the run time of state of the art lithium batteries. Some embodiments may, for example, provide six to twelve or more hours of flight time.

A fuel cell based power generator including one or more fuel cartridges in accordance with the present disclosure provides run time improvement and energy efficiency under specified load power profiles. Moreover, the fuel cell based power generator may be substantially lighter than prior energy storage devices and may have lower projected life-cycle costs, without compromising operation temperature range or environmental and safety performance. The improvement in runtime lies in the innovative fuel-cell technology and its fuel chemistry based on lithium aluminum hydride (LAH) that requires no net water consumption in order to sustain its operation, thus eliminating the need for a water fuel reservoir, which enables the energy source to be substantially smaller and lighter than other conventional chemical hydride or direct methanol fuel cells with on-board storage of water (fuel, diluent, or solvent).

In some embodiments, hydrogen is stored in the form of solid chemical hydride granules. These granules can be collected in packed beds. In some embodiments, the granules can be collected in fluidized beds. When not in use, the beds can be surrounded by inert gas(es) sealed in by valves on either side of the beds. Accordingly, embodiments herein obviate the need in previous approaches for regulators and avoid issues associated with containing high pressures.

In use, the valves are opened allowing a combination of water vapor and inert gas(es) to flow into the cartridge, where a manifold directs the combined gases through the beds. The water vapor reacts exothermically with the chemical hydride granules in the beds, converting the chemical hydride to solid chemical oxides and hydroxides, and producing hydrogen gas that is directed out of the cartridge by another manifold.

A temperature of the fuel cartridge can be controlled by conduction and/or convection. In some embodiments, heat is carried away from the fuel by a thermally conductive housing around, between, and/or through the beds. In some embodiments, a coolant (e.g., gas and/or liquid) can be flowed over some or all of the exterior of the cartridge to carry the heat away from the cartridge. In some embodiments, the cartridge can include a housing configured to provide cooling functions. For instance, in some embodiments, the cartridge housing can incorporate interface features for a fan and/or pump to circulate the coolant. In some embodiments, the cartridge housing can incorporate interface features for a fan duct or tubing to direct the coolant. In some embodiments, the cartridge housing can incorporate a manifold for directing the coolant around the cartridge. A temperature of the beds can be determined via temperature sensors inserted into the beds, and coolant flow properties, such as flow rate, can be controlled (e.g., in a closed loop) to regulate the bed temperature.

FIG. 1 is a schematic diagram of a fuel cell based power generator 100 in accordance with an embodiment of the present disclosure. In the embodiment shown in FIG. 1, power generator 100 includes a fuel cell 110 and a hydrogen generator 115.

As used herein, the term "fuel cell" can, for example, refer to an electrochemical cell that converts chemical energy from a fuel into electricity through an electrochemical reaction. For example, hydrogen can be provided to fuel cell 110 such that hydrogen is consumed in an electrochemical reaction to produce electricity, as is further described herein. An ambient air path 120 is configured to run ambient air past a cathode side of the fuel cell 110, via ambient air path portion 122. The ambient air path 120 is part of a cathode loop, which includes all the paths that ambient air circulates through, including interiors of components the ambient air passes through.

A reaction in the fuel cell 110 generates electrical power and adds water as a by-product to the ambient air path portion 122. This water is then provided to the hydrogen generator 115, which contains one or more fuels that release hydrogen responsive to exposure to water, which may be in vapor form. As used herein, the term "hydrogen generator" refers to a device which contains one or more fuels that release hydrogen responsive to exposure to water, which may be in the form of humidity.

The hydrogen generator 115 provides the released hydrogen to a recirculating hydrogen path 125 also referred to as anode loop 125, which splits into two parts at junction 127. The two parts include a primary path 126 and a secondary path 128. The primary path 126 recirculates released hydrogen back to hydrogen generator 115. The secondary path 128 runs past the anode side of the fuel cell 110 to provide the hydrogen to the fuel cell 110. The secondary path 128 is part of an anode loop 125, which includes all the paths that hydrogen recirculates through, including interiors of components the ambient air passes through.

Hydrogen from the anode loop 125 reacts with oxygen from the ambient air path 120 in fuel cell 110, producing electrical power, water vapor, and heat as reaction byproducts. The byproducts on the cathode side of the fuel cell 110 are removed from the fuel cell by the air flowing within ambient airflow path 120. Leftover hydrogen and any inert gases that leak/permeate into the anode loop over time continue through the anode loop 125.

In some embodiments, a cooling mechanism 132, such as a fan or liquid cooling loop, can be used with the fuel cell portion system to assist in the removal of heat. In such an embodiment, most of the heat generated in the fuel cell is removed via this liquid cooling loop and rejected to ambient via a heat exchanger and/or fan, represented in block form as part of the cooling mechanism 132.

In some embodiments, as shown in FIG. 1, the secondary path 128 can include a purge valve 129 that purges inert gases (e.g. nitrogen, water vapor) that build up over time in the anode loop into an ambient airflow path portion 123 of the ambient airflow path 120. These gases are purged periodically by actuating the purge valve 129, for example, based on predetermined timing or a sensed parameter like fuel cell voltage or hydrogen concentration. In some embodiments, the valve may be slightly open most of the time to continuously remove the inert gases, with most of the hydrogen flowing to and being consumed by the anode of the fuel cell.

In some embodiments, the fuel cells provide current to a controller 135 that charges a Li-ion battery or batteries 130. The controller 135 also provides power to a load, such as the UAS. In some implementations, the batteries can provide the ability to supply higher and more dynamic levels of power than simply utilizing the fuel cells directly, which can be slower to respond and not normally be able to provide high levels of power that may be required for operation of the UAS in a desired manner, such as accelerating sufficiently while carrying a load.

Controller 135 may comprise a microprocessor, circuitry, and other electronics to receive data representative of sensed pressure, temperature, and other parameters and utilize control algorithms, such as proportional/integral/derivative (PID) or other type of algorithms to control mechanisms to modify the parameters to meet one or more different setpoints. Controller 135 may also be referred to as a power management module or controller 135. In some embodiments, control may be based on proportional controller.

In some embodiments, the fuel cell based power generator 100 has a system configuration (implemented in a X590 form factor battery package in one embodiment) and its operating principle is schematically depicted in FIG. 1. Hydrogen generator 115, in various embodiments, is a replaceable and disposable "fuel-cartridge" unit that generates $H_2$ for a $H_2$/oxygen proton exchange membrane (PEM) fuel cell 110, and a permanent unit that, in some embodiments, includes PEM fuel cell 110, Li-ion recharge battery (storage device 130) as an output stage to interface with an external load, and the controller 135 that controls electronic and fluidic control circuits (e.g., controlling one or more fluid movement apparatuses) to dynamically sense and optimize the power generator 100 under varying load and environmental conditions.

Ambient air serves as the fuel cell power generator 100 oxygen source, carrier gas for water vapor, and coolant gas for the fuel cell stack and $H_2$ generator. A first fluid movement apparatus (e.g., a fan) 140 draws in fresh air from ambient via an inlet 142 and circulates it over the cathode side of the fuel cell stack at 121 via the ambient air path or passage 120.

Since the fuel cell 110 reaction is exothermic, the temperature of the fuel cell 110 increases and may be measured by a first temperature sensor 143 associated with fuel cell 110, which is positioned to measure the temperature of the fuel cell 110. The temperature sensor is shown in block form and may be placed anywhere such that it is thermally coupled to the fuel cell 110 to provide a reliable measurement of the temperature of the fuel cell 110. First temperature sensor 143 may comprise multiple temperature sensors. In one embodiment, one of the temperature sensors is coupled to provide data representative of the temperature proximate the anode, and another coupled to provide data representative of the temperature proximate the cathode of the fuel cell 110. The temperature data is provided to the controller 135 for use in controlling to one or more setpoints. A fuel cell set point temperature of the fuel cell 110 is indicated as 60° C., which has been found to be a temperature at which the fuel cell 110 functions most efficiently.

In further embodiments, the set point may vary between 40° C. and 80° C., and may vary further depending on the configuration and specific materials utilized in fuel cell 110 and power generator 100. Different optimal set points for the fuel cell may be determined experimentally for different fuel cells and may be found to be outside the range specified above.

The fuel cell temperature is modified via cooling mechanism 132 (e.g., liquid cooling loop with liquid pump, heat exchanger, and fan) under control of controller 135 that receives temperature information from first temperature sensor 143. The first temperature sensor 143 may include separate temperature sensors to sense temperatures of both the anode side and cathode side of the fuel cell 110.

In some embodiments, the fuel cell temperature and hydrogen generator temperature can be controlled separately. Separately controllable fans and or fluid pumps may be used for such independent control. The power management module may control various pressures and temperatures via the various mechanisms using one or more of PID control, proportional control, or other type of algorithm. Temperatures may be controlled within desired temperature ranges defined by upper and lower temperature thresholds.

While the fuel cell 110 is producing electrical power as well as heat, ambient air flowing within path 120 delivers oxygen to the fuel cell 110 cathode and removes water vapor generated by the reaction in the fuel cell 110. The hot, humid air continues down path 120 to a first water exchanger 155. The first water exchanger 155 extracts water from the hot, humid ambient air and passes the extracted water into the hydrogen flow path at 124 (part of the anode loop 125). The hot, somewhat drier air continues down path 122' to a second water exchanger 157, where heat and water is passed into the cathode loop. This heat and water raise the temperature and humidity of the incoming ambient air, which improves fuel cell performance. After exiting the second water exchanger, the warm dry air is exhausted to the ambient at 160.

The first water exchanger 155, and the operation of the first water exchanger 155, is further described herein. For instance, first water exchanger 155 can be a light-weight, low pressure-drop water exchanger, as will be further described herein.

The extracted water from the ambient air path is then provided to the recirculating hydrogen path to create humid hydrogen ($H_2$) at 124. This humid $H_2$ then flows to the hydrogen generator where water therein interacts with the fuel to generate additional hydrogen.

The hydrogen generator 115 also has a set point temperature at which it operates most efficiently. The temperature may be measured by sensing the temperature of the hydrogen as it exits the hydrogen generator 115 as represented by the position of a sensor 133, which may be a temperature sensor and also may include a pressure sensor. The hydrogen generator experiences an exothermic reaction and has an optimal operating set point is shown as 80° C., but may vary from 60° C.-100° C. or outside the range depending on the composition of the hydrogen generator used.

The hydrogen generator temperature may be controlled by varying the speed of one or more cooling mechanisms 131 positioned to remove heat from the hydrogen generator. The cooling mechanism may be positioned on the outside of the hydrogen generator or positioned proximate the hydrogen generator to effect cooling of the hydrogen generator. For example, in some embodiments, the hydrogen generator temperature is modified by an external cooling mechanism (e.g., a fan, blower, etc.) positioned, for instance, on the surface of the generator. The cooling mechanism may be controlled via the controller 135 using PID or other control algorithms, such as proportional control. The hydrogen generator could also be cooled using a liquid cooling loop and associated liquid pump, heat exchanger, and fan.

The humid hydrogen 124 flows into the hydrogen generator 115, where the water reacts with the fuel and generates hydrogen. The now dry hydrogen leaves the hydrogen generator and flows into blower 165, which raises the pressure.

The higher pressure dry hydrogen then progresses down the anode loop 125 to a split at junction 127 where some of the dry H$_2$ enters a primary path 126 and some dry H$_2$ enters a secondary path 128.

The secondary path 128 is located adjacent the anode side of the fuel cell to provide hydrogen to the fuel cell, while the primary path can be located further away from the fuel cell. This configuration allows for a large amount of hydrogen to recirculate continuously through the system in a hydrogen loop (to efficiently extract the water from the cathode via the ambient air path first water exchanger 155) while flowing a smaller amount of hydrogen to the fuel cell via secondary path 128.

The secondary path 128 can be a dead end with a purge valve 129 therein that allows inert gasses (e.g., nitrogen, water vapor) to be purged from the anode stream by actuating the valve periodically (e.g., based timing or a sensed parameter such as fuel cell voltage or oxygen concentration). Because some water vapor is included in the inert gas, it is desirable to purge the inert gas into the cathode stream 122 upstream of the primary or first water exchanger 155, so that the water vapor can be recovered via first and second water exchangers 155 and 157.

The anode loop pressure as measured by sensor 133 is controlled by varying the blower 165 fan speed, which controls the amount of water recovered from through the first water exchanger 155, and hydrogen generated in the hydrogen generator 115. Higher blower fan speeds lead to higher anode loop pressures, for example, pressures slightly above ambient pressure by 1-10 psig.

Steady state operation of the fuel cell based power generator can be achieved by:

1) Controlling cathode blower speed based on power demand from load;

2) Controlling anode blower speed based on anode loop pressure (e.g., measured via sensor 133 comprising a pressure sensor);

3) Controlling fuel cell cooling based on fuel cell temperature (e.g., via cooling mechanism 132); and/or 4) Controlling pump/fan speed control for cooling mechanism 131 (e.g., fan, blower, cooling loop, etc.) associated with the hydrogen generator (e.g., mounted on the outside of the hydrogen generator) based on hydrogen generator temperature.

In some embodiments, as air passes by the fuel cell stack 110 from the ambient air path 120 and the secondary path 128 of the anode loop 125, oxygen and hydrogen are consumed by the fuel cell 110, and water vapor and waste heat are removed by the ambient air at fuel cell cathode 121.

The power generated in the fuel cell stack may be fed to controller 135 which may include power management circuitry. The circuitry conditions the power and provides it as electricity to a load as indicated by contacts 180.

One or more sensors may measure, in addition to the temperature sensor previously described, humidity, and/or pressure throughout the power generator 100. Data provided by the sensors, as well as the electrical load and/or charge state of the charge storage device 130 are used by the control controller 135 to determine and set the various fluid movement apparatus speeds to control the temperature of the elements to corresponding set points. Power management circuitry can include a controller 135, as is further described herein.

Fuel consumption may also be monitored via controller 135 or other power monitoring device, and the remaining capacity may be displayed via a display on the fuel cell power generator packaging as driven by controller 135 in various embodiments. In some embodiments, greater than 95% fuel utilization may be achieved through an optimized LAH fuel formation (e.g., through one or more of porosity, particle size/distribution, rate enhancing additives, or other formulation characteristics).

In some embodiments, the LAH-water reaction generates heat (~150 kJ/mol LAH, exothermic) leading to a rise in temperature in the fuel. The temperature may be monitored along with controlling the speed of the hydrogen generator cooling fan to maintain the temperature at a desired set point for optimal operation.

Electrochemical system power performance can substantially degrade at low temperatures (−40° C.) due to slower reaction kinetics and lower electrolyte conductivity. The hybrid fuel cell may avoid freezing problems by: 1) using water in vapor form, 2) adjusting airflow to prevent water vapor condensation, 3) using heat generated by the fuel cell stack and H$_2$ generator to regulate their temperatures, 4) Insulating certain system components, and 5) using electrically power heaters to control the temperature of certain system components. In some embodiments, noryl plastic packaging (e.g., consistent with the type used on the Saft BA5590) may be used. Many different types of plastics and/or other materials (e.g., that provide low weight yet sufficient tolerance to the operating parameters and environmental conditions of the generator) may be used.

Hydrogen generator 115 in some embodiments is a high-rate hydrogen generator suitable for man-portable power and micro air vehicle applications that provides four to five times the hydrogen of commercially available hydrogen sources of the same size and weight. Many different hydrogen producing fuels, such as LAH may be used. In further embodiments, the hydrogen producing fuel may, for example, include $AlH_3$, $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or combinations of one or more thereof.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Hydrogen-Generating Composition for a Fuel Cell

In various embodiments, the present disclosure provides a hydrogen-generating composition for a fuel cell.

The hydrogen-generating composition reacts with water to generate hydrogen gas. The phase of the water contacted with the hydrogen-generating composition to generate the hydrogen gas can be any suitable phase, such as liquid water (e.g., in a pure state, diluted state, or such as having one or more compounds or solvents dissolved therein) or gaseous water (e.g., water vapor, at any suitable concentration). The generated hydrogen gas can be used as the fuel for a hydrogen-consuming fuel cell.

The hydrogen-generating composition can be in any suitable form. The hydrogen-generating composition can, for example, be in the form of a loose powder or a compressed powder. The hydrogen-generating composition can also be in the form of grains or pellets (e.g., a powder or grains compressed into pellets). The hydrogen-generating composition can have any suitable density, such as, for example, about 0.5 g/cm$^3$ to about 1.5 g/cm$^3$, or about 0.5 g/cm$^3$ or less, or less than, equal to, or greater than about 0.6 g/cm³, 0.7, 0.8, 0.9, 1, 1.1, 1.2, 1.3, 1.4 g/cm³, or about 1.5 g/cm³ or more.

In some embodiments, the hydrogen-generating composition is substantially free of elemental metals. In some embodiments, the hydrogen-generating composition can be substantially free of elemental aluminum.

Hydride

The hydrogen-generating composition may include one or more hydrides. The one or more hydrides can form any suitable proportion of the hydrogen-generating composition, such as about 50 wt % to about 99.999 wt %, about 70 wt % to about 99.9 wt %, about 70 wt % to about 90 wt %, or about 50 wt % or less, or less than, equal to, or greater than about 52 wt %, 54, 56, 58, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98, 99, 99.9, 99.99, or about 99.999 wt % or more.

The hydride can be any suitable hydride, such that the hydrogen-generating composition can be used as described herein. The hydride can be a compound in which one or more hydrogen centers (e.g., one or more hydrogen atoms, or a group that includes one or more hydrogen atoms) having nucleophilic, reducing, or basic properties.

The hydrogen atom in the hydride can be bonded to a more electropositive element or group. For example, the hydrogen can be chosen from an ionic hydride (e.g., a hydrogen atom bound to an electropositive metal, such as an alkali metal or alkaline earth metal), a covalent hydride (e.g., compounds including covalently bonded hydrogen and that react as hydride, such that the hydrogen atom or hydrogen center has nucleophilic properties, reducing properties, basic properties, or a combination thereof), a metallic hydride (e.g., interstitial hydrides that exist within metals or alloys), a transition metal hydride complex (e.g., including compounds that can be classified as covalent hydrides or interstitial hydrides, such as including a single bond between the hydrogen atom and a transition metal), or a combination thereof.

The hydride can be chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof. The hydride can be chosen from lithium aluminum hydride ($LiAlH_4$), calcium hydride ($CaH_2$), sodium aluminum hydride ($NaAlH_4$), aluminum hydride ($AlH_3$), and a combination thereof. The hydride can be lithium aluminum hydride ($LiAlH_4$).

In some embodiments, the hydrogen-generating composition only includes a single hydride and is substantially free of other hydrides. In some embodiments, the hydrogen-generating composition only includes one or more hydrides chosen from lithium aluminum hydride ($LiAlH_4$), calcium hydride ($CaH_2$), sodium aluminum hydride ($NaAlH_4$), and aluminum hydride ($AlH_3$), and is substantially free of other hydrides.

In various embodiments, the hydrogen-generating composition only includes the hydride lithium aluminum hydride ($LiAlH_4$), and is substantially free of other hydrides. In some embodiments, the hydrogen-generating composition can be substantially free of simple hydrides that are a metal atom directly bound to a hydrogen atom. In some embodiments, the hydrogen-generating composition can be substantially free of lithium hydride and beryllium hydride.

In various embodiments, the hydrogen-generating composition can be substantially free of hydrides of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), hydrides of organic cations including ($CH_3$) methyl groups, or a combination thereof. In some embodiments, the hydrogen-generating composition can be substantially free of one or more of lithium hydride (LiH), sodium hydride (NaH), potassium hydride (KH), magnesium hydride ($MgH_2$), calcium hydride ($CaH_2$), lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), or mixtures thereof.

In various embodiments, the hydrogen-generating composition includes a metal hydride (e.g., an interstitial intermetallic hydride). Metal hydrides can reversibly absorb hydrogen into their metal lattice. The metal hydride can be any suitable metal hydride.

The metal hydride can, for example, be $LaNi_5$, $LaNi_{4.6}Mn_{0.4}$, $MnNi_{3.5}Co_{0.7}Al_{0.8}$, $MnNi_{4.2}Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, $LaNi_{5-x}Al_x$ wherein x is about 0 to about 1, or any combination thereof. The metal hydride can be $LaNi_{5-x}Al_x$ wherein x is about 0 to about 1 (e.g., from $LaNi_5$ to $LaNi_4Al$). The metal hydride can form any suitable proportion of the hydrogen-generating composition, such as about 10 wt % to about 99.999 wt %, or about 20 wt % to about 99.5 wt %, or about 10 wt % or less, or less than, equal to, or greater than about 15 wt %, 20, 21, 22, 23, 24, 25, 26, 27, 28, 29, 30, 35, 40, 45, 50, 55, 60, 65, 70, 75, 80, 85, 90, 91, 92, 93, 94, 95, 96, 97, 98, 99, 99.5, 99.9, 99.99, or about 99.999 wt % or more. Any metal hydride that is described in U.S. Pat. No. 8,172,928, incorporated by reference herein in its entirety, can be included in the present hydrogen-generating composition.

The hydrogen-generating composition can include both a metal hydride (e.g., an interstitial intermetallic hydride, such as $LaNi_{5-x}Al_x$ wherein x is about 0 to about 1), and a chemical hydride (e.g., an ionic hydride or a covalent hydride, such as magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof).

Metal Oxide

In various embodiments, the hydrogen-generating composition can include one or more metal oxides. In some embodiments, the hydrogen-generating composition can be free of metal oxides. The one or more metal oxides can form any suitable proportion of the hydrogen-generating composition, such as about 0.001 wt % to about 20 wt % of the hydrogen-generating composition, about 1 wt % to about 10 wt %, or about 0.001 wt % or less, or less than, equal to, or greater than about 0.01, 0.1, 1, 2, 3, 4, 5, 6, 7, 8, 9, 10, 12, 14, 16, 18, or about 20 wt % or more.

The metal oxide can be any suitable metal oxide, such that the hydrogen-generating composition can be used as described herein. The metal oxide can be zirconium (IV) oxide, hafnium (IV) oxide, titanium (IV) oxide, or a combination thereof. The metal oxide can be titanium (IV) oxide.

The hydrogen-consuming fuel cell can include an anode, a cathode, and an electrically-insulating ion-conducting electrolyte (e.g., a membrane, such as a proton exchange membrane, or PEM) separating the anode and cathode, wherein at least one of the anode or cathode undergoes a chemical reaction that consumes hydrogen and generates an electrical potential across the electrodes. In some embodiments, the cathode of the fuel cell consumes hydrogen gas and generates electrons and hydrogen ions.

The hydrogen ions can travel across the electrolyte to the cathode, while the electrons can travel to the cathode via an electrical circuit connecting the anode to the cathode. At the cathode, the hydrogen ions can react with oxygen gas and the electrons produced by the anode to form water.

The water vapor reacts with the chemical hydride fuel in the hydrogen generator, and generates hydrogen in an exothermic reaction. The hydrogen is carried to a PEM fuel cell as illustrated in FIG. 1 to generate electrical power.

The hydrogen generator 115 may be contained in a replaceable and disposable (recyclable) cartridge such as a container. The hydrogen generator 115 may be cylindrical in geometry in some embodiments.

During the electrochemical reaction in fuel cell 110 that produces energy, water vapor, and heat as reaction byproducts, the ambient air within the path 120 is heated and water is added resulting in hot, wet air travelling through the path at 122.

The first water exchanger 155 extracts water from the hot, wet air within ambient air path at 123, and exhausts hot, dry air outside the power generator 100 at exhaust 160. The set point temperature, which in some embodiments is 60° C., may, for example, vary from 40° C. to 80° C. in some embodiments, or outside that range depending on the type of water exchanger utilized as first water exchanger 155. The extracted water from the ambient air path 120 is provided to the anode loop 125 to release additional hydrogen at 124 from hydrogen generator 115. Temperature sensors in the anode and cathode loops may be used to determine and control the first water exchanger 155 temperature. One or more sensors may be positioned proximate outlets of the water exchanger to provide a temperature data to the controller 135.

As shown in the embodiment of FIG. 1, the power generator 100 can also include one or more other water exchangers, such as second water exchanger 157. Second water exchanger 157 transfers heat and water vapor to the incoming air at inlet 142, which improves fuel cell performance. In some embodiments a single water exchanger which combines the functions of the first and second water exchangers (e.g. has separate flow paths for the anode and cathode loops) is used to save weight.

Once the released hydrogen travels from hydrogen generator 115 through anode loop 125, it progresses to junction 127 where some of the hydrogen enters a primary path 126 to be recirculated and some hydrogen enters a secondary path 128 to be provided for the electrochemical reaction in fuel cell 110.

As described above, the electrochemical reaction in fuel cell 110 can produce energy. In some embodiments, the fuel cell 110 charges a charge storage device 130. The charge storage device can be a rechargeable battery such as a lithium-ion battery, a capacitor, or any other suitable charge storage device. In other words, charge storage device 130 is coupled to power generator 100 such that charge storage device 130 receives electricity generated by fuel cell 110.

In some implementations, the charge storage device 130 can provide the ability to supply higher and more dynamic levels of power than simply utilizing the fuel cell 110 directly, which can be slower to respond and not normally be able to provide high levels of power that may be required for operation of a UAS in a desired manner, such as accelerating sufficiently while carrying a load. In the embodiment of FIG. 1, power generated by the fuel cell 110 can be provided for storage in one or more charge storage devices 130, and/or provided directly to the load from the controller 135.

As illustrated in FIG. 1, power generator 100 can include controller 135. Controller 135 can provide inputs to power generator 100 such that power generator 100 can run optimally, producing power to be stored in charge storage device 130 for use by a UAS, for example. For example, controller/power management electronics can manage flow of power from the fuel cell to the load, and/or control other aspects of power generation (e.g., regulation of temperatures, pressures, flow rates, etc.)

Controller 135 can provide inputs to power generator 100 in various ways such that power generator 100 can optimally generate power, as are further described herein. For example, in some embodiments, controller 135 can provide inputs to power generator 100 based on a pressure in anode loop 125. In some embodiments, controller 135 can provide inputs to power generator 100 based on a current draw by the load (e.g., a UAS) from charge storage device 130. However, embodiments of the present disclosure are not limited to control schemes for power generator 100. For example, controller 135 can provide inputs for other system controls. For instance, controller 135 can control the temperature of the fuel cell/hydrogen generator, pressure in the anode loop, flow in anode and cathode loops, state of charge of charge storage device, anticipated changes in load from the device the power source is powering, etc.

As described above, in some examples controller 135 can provide inputs to power generator 100 based on a pressure in anode loop 125. Controller 135 can receive a pressure reading in anode loop 125, where the pressure in anode loop 125 is based on the blower fan speed of blower 165.

The pressure reading received by controller 135 can be the pressure in anode loop 125. The pressure in anode loop 125 can be the absolute pressure or the gauge pressure relative to the local ambient pressure. For example, a sensor included in anode loop 125 can determine the pressure in anode loop 125 and transmit the pressure to controller 135. The pressure in anode loop 125 can allow controller 135 to determine a speed of blower 165 in order to allow hydrogen generator 115, fuel cell 110, first water exchanger 155 and/or second water exchanger 157 to operate optimally, as is further described herein. That is, the speed of blower 165 can affect operating parameters of the hydrogen generator 115, fuel cell 110, first water exchanger 155 and/or second water exchanger 157 according to the operational scheme of power generator 100 as described above.

Controller 135 can determine whether the pressure in anode loop 125 exceeds a threshold pressure. As an example, the sensor in anode loop 125 can determine the pressure in anode loop 125 is 8 pounds per square inch (PSI). Controller 135 can compare the received pressure to a threshold pressure to determine whether the received pressure exceeds the threshold pressure. The threshold pressure can be a predetermined pressure stored locally in memory included in controller 135.

The threshold pressure can be a pressure range. For example, the pressure range can include an upper threshold pressure and a lower threshold pressure. For instance, operation of power generator 100 may occur optimally at a particular pressure of the anode loop 125, and the particular pressure of the anode loop 125 can fall within the threshold pressure range. That is, the particular pressure of the anode loop 125 can be within the lower threshold pressure and the upper threshold pressure.

In some examples, controller 135 can determine the pressure in anode loop 125 is less than the lower threshold pressure. For example, the lower threshold pressure can be 5 PSI, and the controller 135 can determine the received pressure in the anode loop 125 is 4 PSI. Accordingly, controller 135 can determine the pressure in anode loop 125 is less than the lower threshold pressure.

A drop in pressure in anode loop 125 can, in some examples, correspond to a higher power requirement by the load from charge storage device 130. For example, in response to more power being drawn by the load (e.g., by a UAS), more energy from fuel cell 110 may be needed to meet the demand. As the rate of hydrogen being used by fuel cell 110 increases to generate more energy, the pressure in anode loop 125 can drop, causing the pressure to fall below the lower threshold pressure.

In order to compensate for the rate of hydrogen being utilized by fuel cell 110 from hydrogen generator 115 increasing as a result of the increased load from the UAS, controller 135 can modify the speed of blower 165 to increase the hydrogen generation rate in the hydrogen generator. Controller 135 can modify the speed of blower 165 by increasing the blower speed such that blower 165 can provide more water vapor to the hydrogen generator 115, which increases the hydrogen generation rate. Increasing the speed of blower 165 thus increases the pressure in anode loop 125 (e.g., to within the threshold pressure range as described above). As a result, operational parameters for various components of power generator 100 can be kept to within ideal operational limits.

In some examples, controller 135 can determine the pressure in anode loop 125 exceeds the upper threshold pressure. For example, the upper threshold pressure can be 12 PSI, and the controller 135 can determine the received pressure in the anode loop 125 is 14 PSI. Accordingly, controller 135 can determine the pressure in anode loop 125 has exceeded the upper threshold pressure.

An increase in pressure in anode loop 125 can, in some examples, correspond to a lower power requirement by the load or the charge storage device 130. For example, in response to lower power being used by the load (e.g., by a UAS) or by charge storage device 130, power may be required from fuel cell 110. As the rate of hydrogen being used by fuel cell 110 decreases to generate less power for charge storage device 130, the pressure in anode loop 125 can increase, causing the pressure to increase above the higher threshold pressure.

In order to compensate for the rate of hydrogen being utilized by fuel cell 110 from hydrogen generator 115 decreasing as a result of the decreased load from the UAS or charge storage device 130, controller 135 can modify the speed of blower 165. Controller 135 can modify the speed of blower 165 by decreasing the blower speed such that blower 165 can provide less water vapor to hydrogen generator 115, which decreases the hydrogen generation rate. Decreasing the speed of blower 165 can correspondingly decrease the pressure in anode loop 125 (e.g., to within the threshold pressure range as described above). As a result, operational parameters for various components of power generator 100 can be kept to within ideal operational limits.

Although the lower threshold pressure is described above as being 5 PSI and the upper threshold pressure is described above as being 14 PSI, embodiments of the present disclosure are not so limited. For example, the upper and lower threshold pressures can be any other pressure value. In some examples, the pressure values of the upper and lower threshold pressures can vary based on the load (e.g., the UAS), the type of hydrogen fuel utilized by hydrogen generator 115, among other parameters.

As described above, modifying the speed of blower 165 can affect operating parameters of various components of power generator 100. For example, modifying the speed of blower 165 to modify the pressure in anode loop 125 can maintain an inlet and outlet relative humidity of fuel cell 110 within a predetermined range, maintain an inlet and outlet relative humidity of hydrogen generator 115 within a predetermined range, maintain an inlet and outlet relative humidity of first water exchanger 155 and/or second water exchanger 155 within a predetermined range, and/or a temperature of first water exchanger 155 and/or second water exchanger 157 within a predetermined range, among other operating parameters and/or other operating parameters of other components of power generator 100.

Various sensors can be utilized to monitor components of power generator 100. For example, the various components of power generator 100 can include temperature sensors that can transmit temperatures of hydrogen generator 115, fuel cell 110, and/or first water exchanger 155 and/or second water exchanger 157 to controller 135. In some examples, controller 135 can maintain operating temperatures of the hydrogen generator 115, fuel cell 110, and/or first water exchanger 155 and/or second water exchanger 157 utilizing a fan and/or fans (e.g., operation of the fan/fans can lower the operating temperatures). In some examples, controller 135 can maintain operating temperatures of the hydrogen generator 115, fuel cell 110, and/or first water exchanger 155 and/or second water exchanger 157 utilizing a pump circulating cooling fluid to the components of power generator 100 (e.g., operation of the pump circulating the cooling fluid can lower the operating temperatures).

As described above, in some examples controller 135 can provide inputs to power generator 100 based on a current draw by the load (e.g., a UAS) from charge storage device 130. Controller 135 can receive an amount of current draw from charge storage device 130 coupled to fuel cell 110. As described above, the charge storage device 130 receives electricity generated by fuel cell 110 in response to hydrogen being provided to an anode of fuel cell 110. Hydrogen can be supplied to the anode via blower 165 by way of anode loop 125 and secondary path 128.

Figure 2:
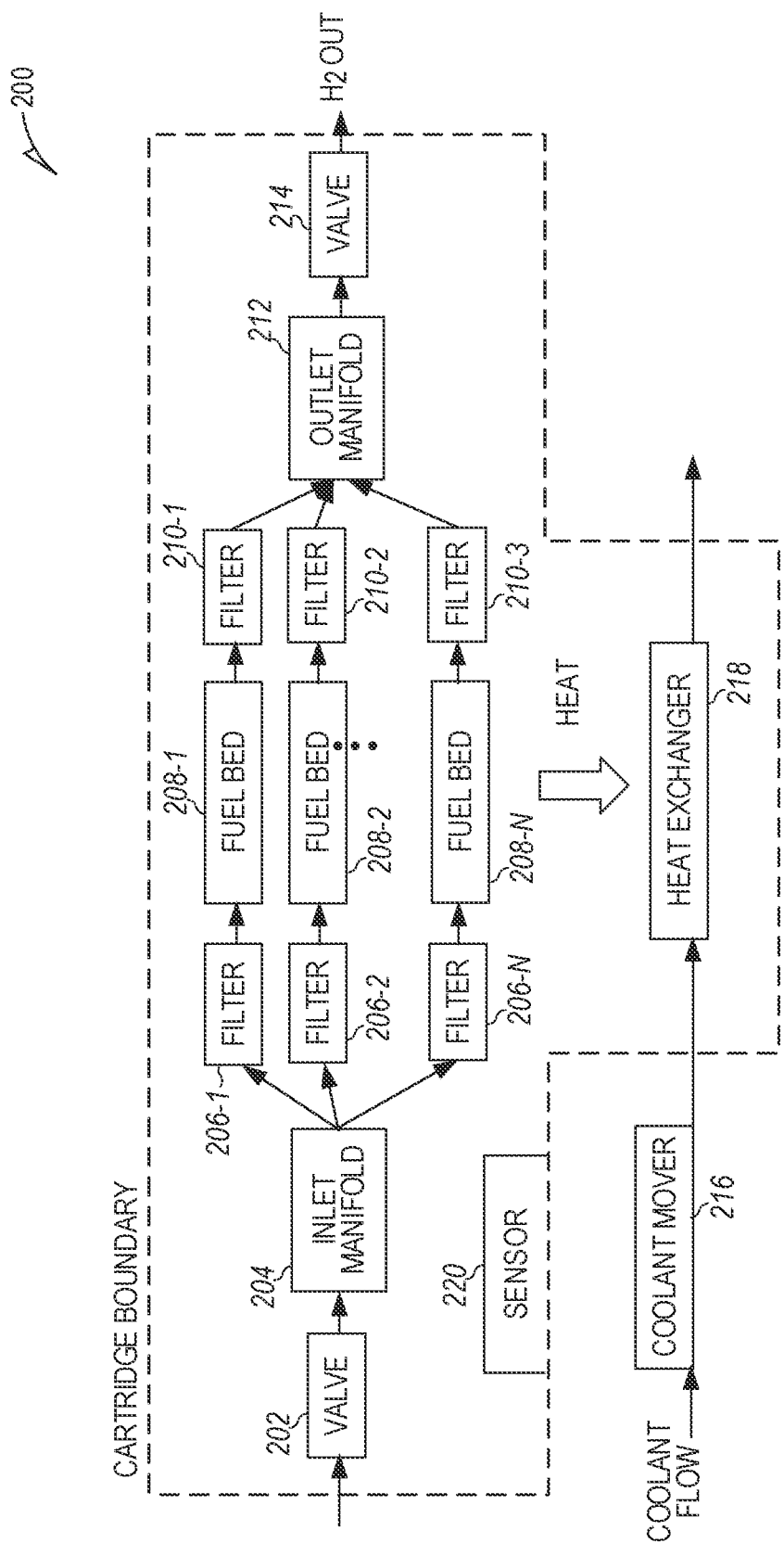
FIG. 2 illustrates a block diagram of an example fuel cartridge in accordance with one or more embodiments of the present disclosure.

FIG. 2 illustrates a block diagram of an example fuel cartridge 200 in accordance with one or more embodiments of the present disclosure. The fuel cartridge 200 can be a portion of a larger system and/or device, such as the fuel cell based power generator discussed above in connection with FIG. 1, where it is embodied as the hydrogen generator 115, for instance. It is noted, however, that embodiments herein are not limited to such implementations.

The fuel cartridge 200 includes an inlet valve 202 coupled to an inlet manifold 204. Fuel cartridge 200 also includes a first filter 206-1, a second filter 206-2, a third filter 206-N (sometimes cumulatively referred to as "filters 206-1-N" which include N filters where N is greater than 2, coupled to the inlet manifold 204). A first fuel bed 208-1, a second fuel bed 208-2, a third fuel bed 208-N (sometimes cumulatively referred to as "fuel beds 208-1-N") which includes N corresponding fuel beds coupled to the N filters 206-1-N. A fourth filter 210-1, a fifth filter 210-2, a sixth filter 210-N (sometimes cumulatively referred to as "filters 210-1-N") includes N corresponding fuel beds coupled to the N filters 206-1-N. An outlet manifold 212 is coupled to the N filters 210-1-N. A valve 214 is coupled to the outlet manifold 212. A coolant mover 216 and a heat exchanger 218 are coupled to cool the fuel cartridge. It is noted that while three filters 206-1-N, three fuel beds 208-1-N, and three filters 210-1-N are shown, embodiments herein are not so limited. Similarly, where single quantities of components are shown (e.g., the inlet valve 202), it is to be understood that different quantities may be used.

Fuel can be stored in the fuel beds 208-1-N in the form of solid chemical hydride granules. In some embodiments, these granules can be packed in the beds 208-1-N; in some embodiments, the granules can be fluidized in the beds 208-1-N. When not in use, the beds can be surrounded by inert gas(es) sealed in by the inlet valve 202 and valve 214 and filters 208-1-N on either side of the beds 208-1-N. As previously discussed, the fuel can include one or more of a number of materials such as, for instance, a chemical hydride material. The filters 206-1-N and the filters 210-1-N can be gas-permeable screens, for instance, sized to allow the passage of water, water vapor, hydrogen gas, and/or other gases but prevent the passage of the fuel therethrough.

In use, the inlet valve 202 can be opened allowing a combination of water vapor and inert gas(es) to flow into the inlet manifold 204. The manifold 204 directs the combined gases through the filters 206-1-N to, and then through, the fuel beds 208-1-N. In the fuel beds 208-1-N the water vapor reacts exothermically with the chemical hydride granules, converting the chemical hydride to solid chemical oxides and hydroxides, and producing hydrogen gas. The produced hydrogen gas (along with the inert gas(es) and unreacted water vapor) flows out of the fuel beds 208-1-N past the filters 210-1-N and is directed via the outlet manifold 212 through the valve 214 (also opened) and out of the fuel cartridge 200.

Stated differently, a method for producing hydrogen gas can include containing a granular hydride material and an inert gas in a plurality of parallel fuel beds 208-1-N of the fuel cartridge 200, passing water vapor from a first end of each of the plurality of fuel beds (e.g., proximal to the inlet manifold 204) through a second end of each of the plurality of fuel beds (e.g., proximal to the outlet manifold 212), wherein hydrogen gas is generated by a respective reaction within each of the plurality of fuel beds 208-1-N, and passing the generated hydrogen gas, the inert gas, and a portion of the water vapor out of the fuel cartridge 200.

The reaction in the fuel beds 208-1-N is exothermic and temperature regulation may be desired. A cooling mechanism, (e.g., the coolant mover 216) can provide a flow of coolant. In some embodiments, the flow of coolant can pass by and/or along a housing, indicated as a cartridge boundary by broken line 213, of one or more of the fuel beds 208-1-N contacting the housing. The housing can conduct heat from the interior of the fuel beds 208-1-N to the coolant, thereby acting as the heat exchanger 218 and carrying heat away from the fuel beds 208-1-N . The housing can be made from aluminum and/or aluminum nitride. In some embodiments, the housing can be made from a polymer. In some embodiments, the housing can be made from a polyester resin. In some embodiments, the housing can be made from biaxially-oriented polyethylene terephthalate (BoPET). In some embodiments, the housing can be made from a material having ultra-high thermal conductivity to weight ratio. In some embodiments, the housing can be made from a multi-layer laminate including a first metal layer separated from a second metal layer by a pyrolytic graphite sheet (PGS). In further embodiments, the fuel beds, and/or housing may be formed using a fiber reinforced polymer.

A structure, geometry, and/or arrangement of the housing defining the fuel beds 208-1-N can be selected to allow the flow of coolant past, along, and/or between the fuel beds 208-1-N. In some embodiments, the coolant mover 216 includes a fan configured to direct air coolant past and/or along the fuel beds 208-1-N . In some embodiments, the coolant mover 216 includes a pump configured to direct liquid coolant past and/or along the fuel beds 208-1-N. Note that in some embodiments, the coolant mover 216 is separate from the cartridge and may be adapted to mate with replaceable cartridges to provide for movement of coolant through heat exchanger 218. The heat exchanger 218 may be integrated with the cartridge or alternatively removably couplable to a replaceable cartridge.

In some embodiments, the housing can provide cooling functions. For instance, in some embodiments, the housing can incorporate interface features for a fan and/or pump to circulate the coolant. In some embodiments, the housing can incorporate interface features for a fan duct or tubing to direct the coolant. In some embodiments, the housing can incorporate a manifold for directing the coolant around the fuel cartridge 200. A temperature of the fuel beds 208-1-N can be determined via one or more temperature sensors. For example, in some embodiments, a temperature sensor is inserted into an interior of one or more of the fuel beds 208-1-N. In some embodiments, a temperature sensor is used to determine a temperature associated with an outer surface of the fuel cartridge 200. Based on determined temperature, coolant flow properties, such as flow rate, can be controlled (e.g., in a closed loop) to regulate the fuel bed temperature (e.g., maintain the fuel bed temperature within a particular temperature range).

Fuel cartridges in accordance with embodiments herein can include a heating mechanism. Such a mechanism may be activated to initiate and/or accelerate the reactions occurring in the fuel beds 208-1-N, for instance. The heating mechanism may be powered via battery 130 and controlled via controller 135.

Figure 3B:
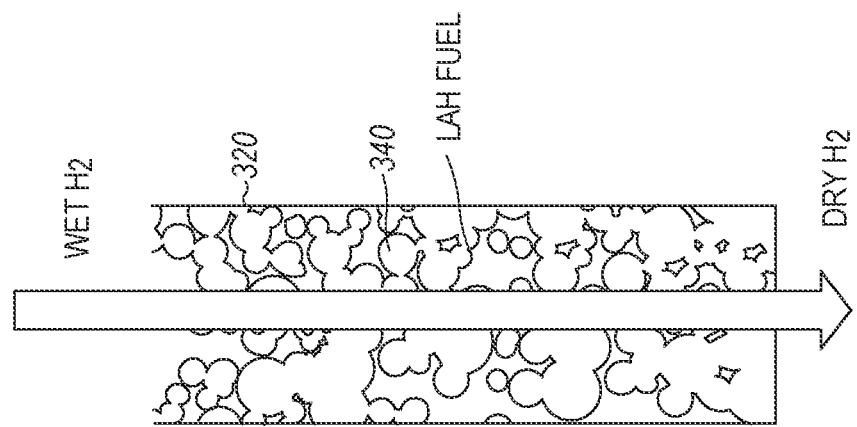
FIG. 3B is a schematic representation of an axial flow tube design in accordance with one or more embodiments of the present disclosure.
Figure 3A:
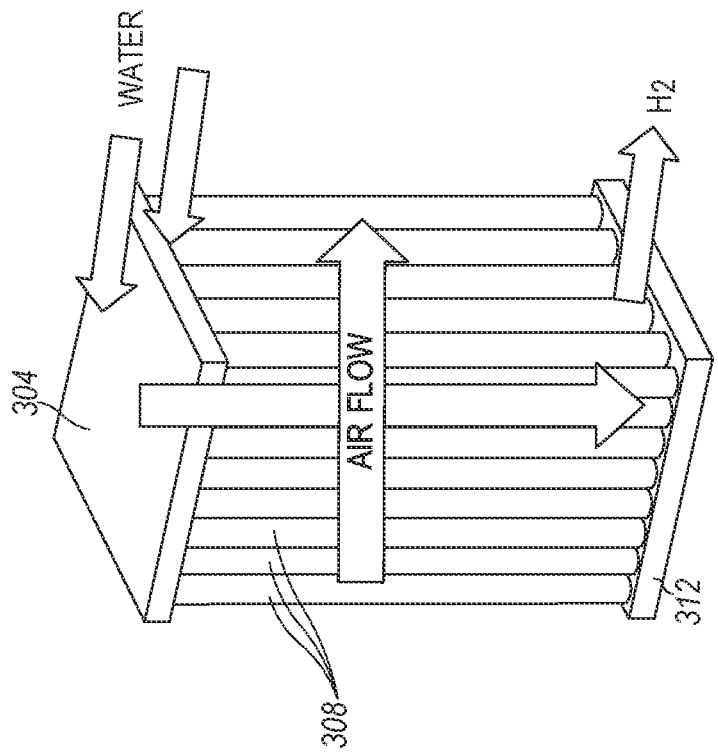
FIG. 3A is a perspective view of an example fuel cartridge in accordance with one or more embodiments of the present disclosure.

FIG. 3A is a perspective view of an example fuel cartridge in accordance with one or more embodiments of the present disclosure. As shown in FIG. 3, the fuel cartridge can include a plurality of cylindrical (e.g., tubular) fuel beds 308 connected at a first end to an inlet manifold 304 and connected at a second end to an outlet manifold 312. The manifolds are shown as blocks for simplicity of illustration but will include one or more passages to couple to the tubular fuel beds 308 to provide water in a first end of the tubes and remove generated hydrogen from the tubes. The fuel beds 308 can be parallel. The fuel beds 308 can be spaced apart such that air is permitted to flow in the spaces between the fuel beds 308. In the example illustrated in FIG. 3A, air can be forced in a direction orthogonal to the fuel beds 308 (e.g., orthogonal to an elongate axis of the fuel beds 308). A filter or screen 328 at the top and bottom of each tube to keep the fuel granules in place, but allow gas to flow in and out with minimal impedance.

Figures 3C, 3D:
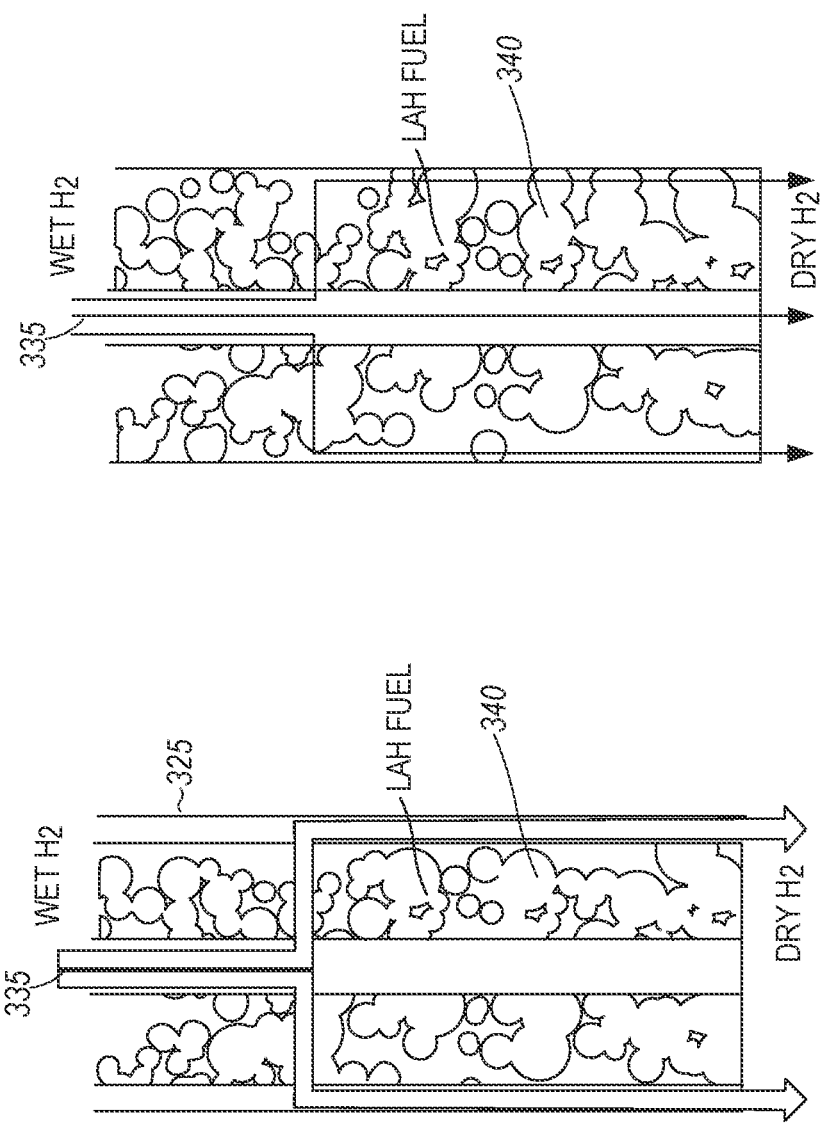
FIG. 3C is a schematic representation of a radial flow tube design in accordance with one or more embodiments of the present disclosure.
FIG. 3D is a schematic representation of a further radial flow tube design in accordance with one or more embodiments of the present disclosure.

FIGS. 3B, 3C, and 3D are schematic representations of radial and axial fuel bed designs 320 in the shape of tubes or rods that may be utilized in the array/manifold structure of FIG. 3A. The axial flow fuel tube design shown in FIG. 3B, a cylindrical structure, may have a fuel tube diameter of:

10 mm to 50 mm and a fuel tube length of: 50 mm to 500 mm in one embodiment. The fuel tubes have thin, lightweight outer shells that are at least substantially gas impermeable in some embodiments to contain the hydrogen generated therein and provide the hydrogen to the hydrogen path via the outlet manifold. The tubes also allow heat to be convected away by the coolant flowing over the outside of the tubes without interfering with hydrogen generation and allowing the control of the temperature of the tubes and fuel therein to be maintained within a narrow desired temperature range of 40-100C. or 60-80C.

The radial flow fuel tube design 325 of FIG. 3C has toroid shape with a gas permeable side screens 326 and a fuel tube diameter of: 10 mm to 50 mm and a fuel tube length of: 50 mm to 500 mm. The "side screens" may be porous/perforated layers that contains the fuel and allows gas to flow (radially) through it into outer flow channel 327.

The radial flow fuel tube design of FIG. 3D has a toroid shape with a bottom screen 328. Packaging materials for the fuel tubes include thin polymers and metals compatible with the fuel.

Wet hydrogen is shown by arrow 335 as entering each of the tubes at one end of the tube, contacting the LAH fuel 340, and exiting at the other end of the tubes as dry hydrogen. In FIG. 3C, the wet hydrogen flows axially through the inner flow channel 329, and then radially though a first side screen 326 into the fuel, then through a second side screen, into the outer flow channel 327, and then axially out the bottom as dry hydrogen. The fuel tube design avoids a large pressure drop over time and helps maintain a flatter hydrogen generation response, as opposed to a high rate of hydrogen production at the beginning of the hydrogen producing life of the fuel tubes followed by a significantly lower rate over time. The design also provides for better utilization of the fuel, as water vapor is distributed more evenly in the fuel, resulting higher average reaction rates and greater fuel utilization above the minimal cutoff rate.

Figure 3E:
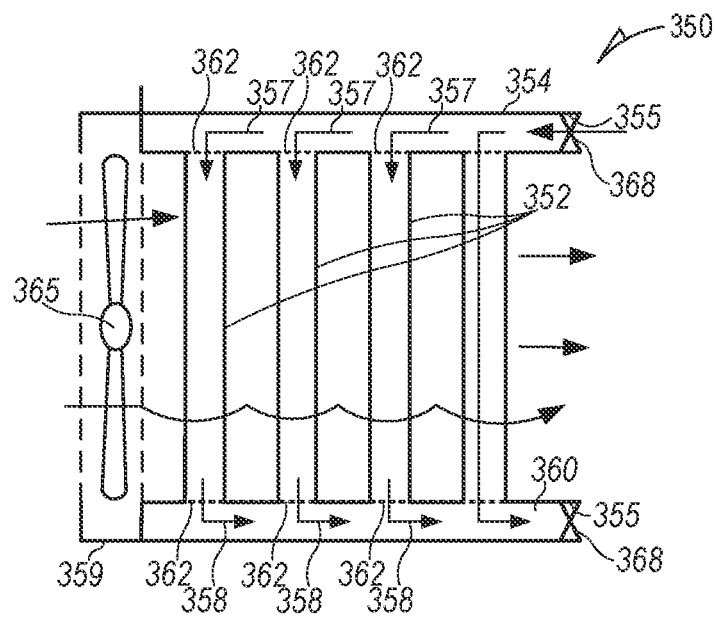
FIG. 3E is cross section block diagram of an alternative fuel cartridge in accordance with one or more embodiments of the present disclosure.

FIG. 3E is a cross section block diagram of a fuel cartridge 350 according to an example embodiment. The fuel cartridge 350 includes multiple tubes or rods of fuel indicated at 352. Each rod is coupled at first ends to a first manifold 354 having an inlet 355 and multiple outlets 357 that are coupled to provide wet hydrogen to the first ends of the fuel rods 352. The second ends of the fuel rods 352 are coupled to inlets 358 of a second manifold 359. Second manifold 359 provides dry hydrogen to the anode loop via an outlet 360 for provision to the fuel cell. Filters 362, represented by broken lines, may be place at the first and second ends of the fuel rods to screen out particles that may foul or clog hydrogen and water vapor flow within the fuel rods.

In one embodiment, the packaging of the fuel rods is impermeable to water vapor and other gases that might impair operation of the hydrogen generating capability of the fuel in the fuel rods. In addition, the manifolds hold the fuel rods in place in a spaced apart manner to allow fluid to flow between the tubes to remove heat generated by the hydrogen producing reaction with the water vapor. A pump or fan 365 may be positioned at a side to blow fluid across the tubes to remove the heat. The fan 365 may be supported by the manifolds such that fluid moved by the fan flows through the openings between the rods and exits the fuel cartridge to efficiently remove heat without encountering significant resistance such that the fan may be low power and light in weight.

In some embodiments, the first manifold inlet and the second manifold outlet may include valves 368 to selectively allow gas to flow through the manifolds and fuel rods. The valves may be iris valves or other types of suitable large conductance valves. The inlet and outlet may be configured to mate with the anode loop in a manner that opens valves 368 to allow hydrogen flow upon insertion of the fuel cartridge 350. The valves 368 operate to preserve the hydrogen producing fuel during transport and storage by preventing air and humidity from entering the manifolds and fuel rods.

Figure 3F:
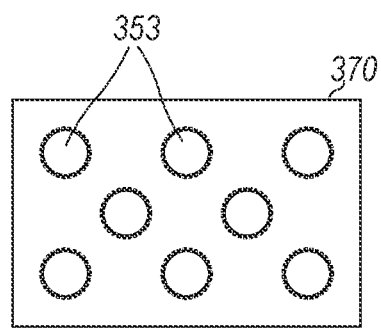
FIG. 3F is a top cross-sectional view of the fuel cartridge of FIG. 3E in accordance with one or more embodiments of the present disclosure.

The rod spacing may be done in in an array like pattern 370 as shown in top cross-sectional view in FIG. 3F, with columns or rods 353 staggered, or otherwise arranged to provide good heat removal by the fluid without significantly restricting the fluid flow. Such a staggered column array facilitates a high hydrogen density fuel cell which may be light in weight.

Figure 3G:
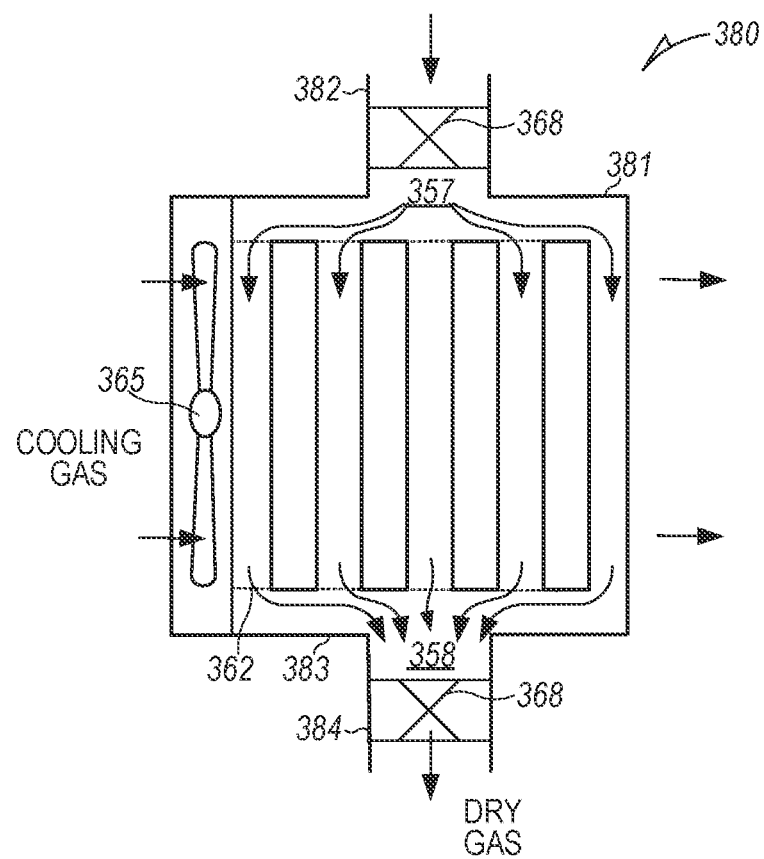
FIG. 3G is a cross section view of a further fuel cartridge in accordance with one or more embodiments of the present disclosure.

FIG. 3G is a cross sectional view of a further fuel cartridge 380 with the same reference numbers of like parts the same as those used for fuel cartridge 350. In fuel cartridge 380, the first manifold 381 inlet 382 is in line with the rods, as is the second manifold 383 outlet 384.

Figure 4:
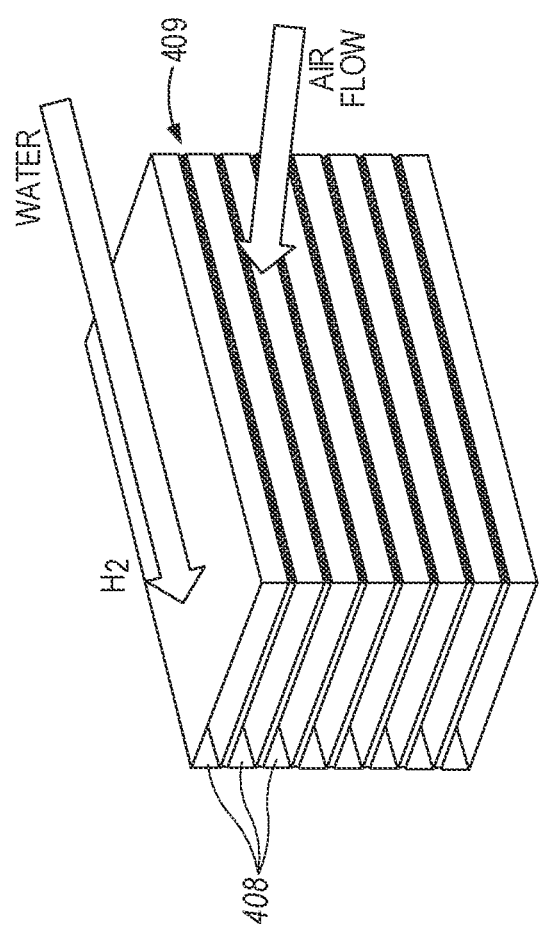
FIG. 4 is a perspective view of another example fuel cartridge in accordance with one or more embodiments of the present disclosure.

FIG. 4 is a perspective view of another example fuel cartridge in accordance with one or more embodiments of the present disclosure. As shown in FIG. 4, the fuel cartridge can include a plurality of stacked rectangular (e.g., slab-shaped) fuel beds 408. No manifolds are illustrated in FIG. 4 so as not to obscure embodiments of the present disclosure. The fuel beds 408 can be spaced apart such that air is permitted to flow through spaces between the fuel beds 408. As shown in the example illustrated in FIG. 4, the housing of the fuel beds 408 can include cooling fins 409. The fins can provide structural strength to the cartridge while allowing fluid to pass through ducts between the fuel beds 408 and conducting heat away from the fuel beds 408 to the passing fluid. The fins 409 may be constructed with a shape similar to that of corrugated cardboard, with airflow facilitated through the openings transverse to the fuel beds 408. Other arrangements of fuel beds and/or ducts can be provided through different housing configurations, such as those illustrated in FIGS. 5-10, which are included for purposes of illustration and are not to be taken in a limiting sense.

Figure 5:
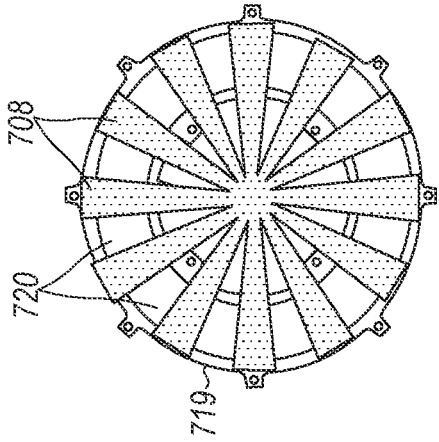
FIG. 5 is a cross-sectional view of another example fuel cartridge in accordance with one or more embodiments of the present disclosure.
Figure 6:
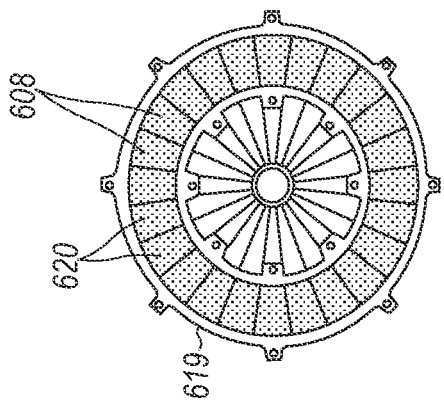
FIG. 6 is a cross-sectional view of another example fuel cartridge in accordance with one or more embodiments of the present disclosure.
Figure 7:
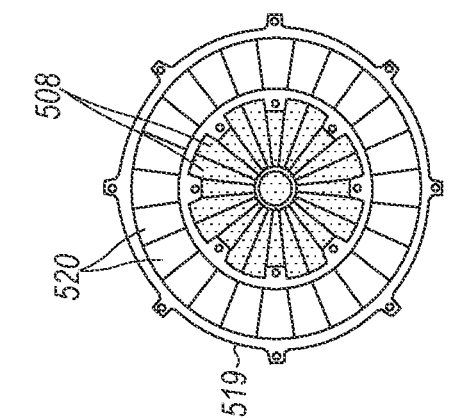
FIG. 7 is a cross-sectional view of another example fuel cartridge in accordance with one or more embodiments of the present disclosure.
Figure 8:
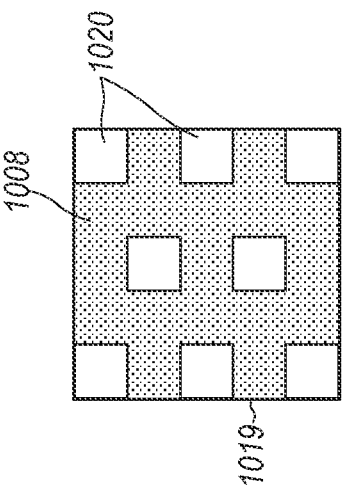
FIG. 8 is a cross-sectional view of another example fuel cartridge in accordance with one or more embodiments of the present disclosure.
Figure 9:
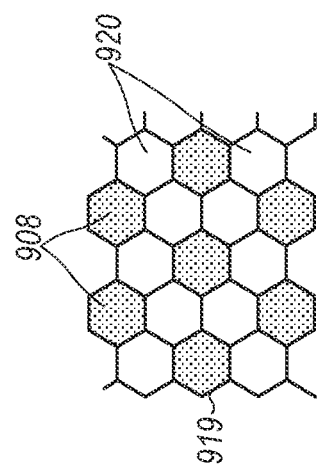
FIG. 9 is a cross-sectional view of another example fuel cartridge in accordance with one or more embodiments of the present disclosure.
Figure 10:
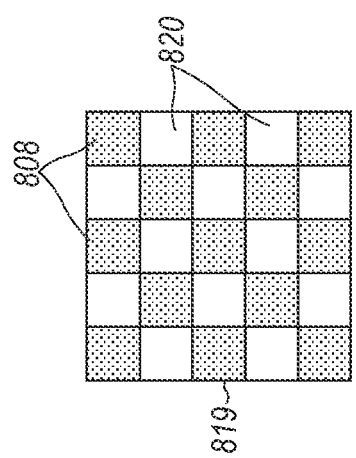
FIG. 10 is a cross-sectional view of another example fuel cartridge in accordance with one or more embodiments of the present disclosure.

FIG. 5 is a cross-sectional view of another example fuel cartridge in accordance with one or more embodiments of the present disclosure. FIG. 6 is a cross-sectional view of another example fuel cartridge in accordance with one or more embodiments of the present disclosure. FIG. 7 is a cross-sectional view of another example fuel cartridge in accordance with one or more embodiments of the present disclosure. FIG. 8 is a cross-sectional view of another example fuel cartridge in accordance with one or more embodiments of the present disclosure. FIG. 9 is a cross-sectional view of another example fuel cartridge in accordance with one or more embodiments of the present disclosure. FIG. 10 is a cross-sectional view of another example fuel cartridge in accordance with one or more embodiments of the present disclosure.

The examples illustrated in FIGS. 5, 6, 7, 8, 9, and 10 each include different housing configurations that define different shapes and configurations of fuel beds and ducts. That is, the examples illustrated in FIGS. 5, 6, 7, 8, 9, and 10 respectively include housings 519, 619, 719, 819, 919, and 1019. These housings 519, 619, 719, 819, 919, and 1019 respectively enclose a plurality of fuel beds 508, 608, 708, 808, 908, and 1008. The housings 519, 619, 719, 819, 919, and 1019 respectively enclose a plurality of ducts 520, 620, 720, 820, 920, and 1020. The housings may also be coupled to manifolds at each end of the fuel beds to transport wet hydrogen from the anode loop into and through the beds, and transport dry hydrogen back to the anode loop.

As shown in FIGS. 5-10, fuel beds in accordance with the present disclosure can be provided in different cross-sectional shapes including, for example, rectangular, square, hexagonal, triangular, and irregular. These examples are not to be taken in a limiting sense and embodiments herein are not limited to a particular shape and/or configuration. Fuel beds can be adjacent to one another in some embodiments and separated by ducts in other embodiments. Fuel beds can be arranged in ring configurations. Fuel beds can be located central to a fuel cartridge in some embodiments. Fuel beds can be located on the periphery of a fuel cartridge in some embodiments. Each of the fuel beds can be separated from other fuel beds by at least one duct. The different configurations can each provide unique thermal performances and/or flow characteristics. Flow of coolant can be parallel and/or substantially in line with hydrogen flow. Flow of coolant can be substantially orthogonal to hydrogen flow.

Figure 12:
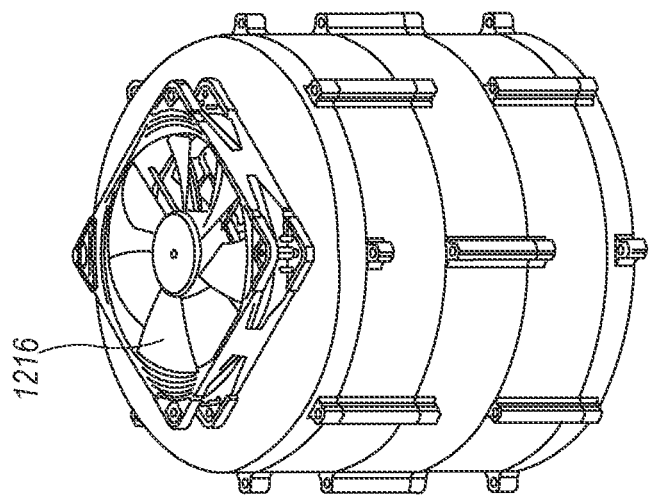
FIG. 12 is a perspective view of the example fuel cartridge illustrated in FIG. 11 showing a fan mounted to the fuel cartridge.
Figure 11:
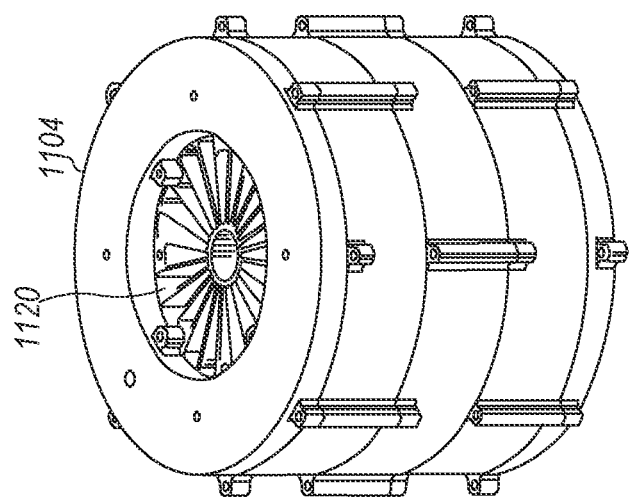
FIG. 11 is a perspective view of another example fuel cartridge in accordance with one or more embodiments of the present disclosure.

FIG. 11 is a perspective view of another example fuel cartridge in accordance with one or more embodiments of the present disclosure. FIG. 12 is a perspective view of the example fuel cartridge illustrated in FIG. 11 showing a fan mounted to the fuel cartridge. The fuel cartridge shown in FIGS. 11 and 12 may be analogous to the cartridge illustrated in FIG. 6, for instance. Accordingly, the inlet manifold 1104 obscures the fuel beds while airflow is permitted through a plurality of substantially-triangular ducts 1120. The air flow can be provided by a fan 1216, which may be mounted to an exterior surface of the inlet manifold 1104.

Figure 13:
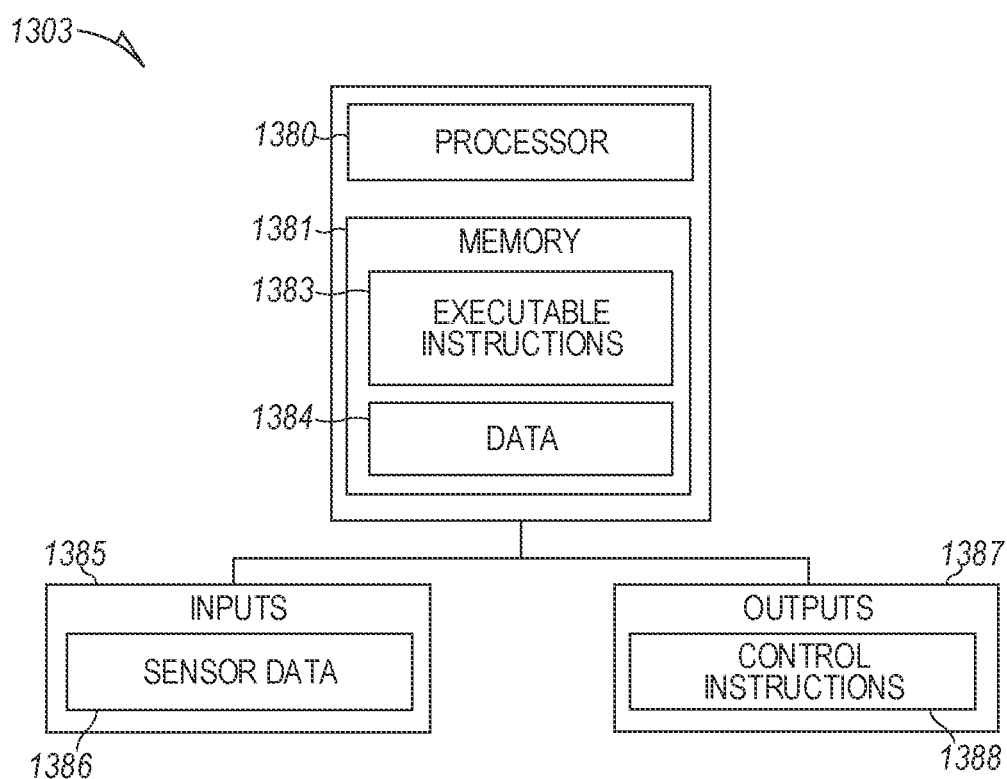
FIG. 13 is a block diagram of a specifically programmed system for executing control methods for a fuel cartridge according to one or more embodiments of the present disclosure.

FIG. 13 is a block diagram of a specifically programmed system for executing control methods for a fuel cartridge according to one or more embodiments of the present disclosure. In the embodiment of FIG. 13, a hardware and operating environment of the system includes a general purpose computing device in the form of a computer 1303 (e.g., a microcontroller, personal computer, workstation, or server), including one or more processing units 1380 and memory 1381. There may be only one or there may be more than one processing unit 1380, such that the processor of computer 1303 comprises a single central-processing unit (CPU), or a plurality of processing units, commonly referred to as a multiprocessor or parallel-processor environment. In various embodiments, computer 1303 is a conventional computer, a distributed computer, or any other type of computer.

The memory can also be referred to as simply memory, and, in some embodiments, includes read-only memory (ROM), random-access memory (RAM). Memory can be stored on a computing device, a memory device, or a computer readable medium, such as a memory stick, CD, tape, or other suitable medium or storing data and/or computing device executable instructions.

A number of executable instruction types 1383 can be stored in memory. For example, memory 1381 can include an operating system, one or more application programs, other program modules, and data stored in memory (e.g., for use by one or more programs) 1384. Programming for implementing one or more processes or method described herein may be resident on any one or number of these computer-readable media.

In further embodiments, power management and control electronics include one or more temperature and power output sensors that are used by the control electronics to maintain operating temperatures. These sensors can provide sensor data 1386 as inputs 1385 into the computing device 1303 for use by one or more programs therein via executable instructions 1383 executed by processor 1380 or to be stored in memory 1381 for use by another computing device.

The control electronics may be configured to maintain design points for such temperatures and/or power output. Instructions 1388 to adjust one or more components of a system (e.g., power generator 100 of FIG. 1) can be sent via one or more outputs 1387. Such outputs can be via a wired connection between the computing device and one or more other components of the system or can be communicated via a wireless connection.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

What is claimed:

1. A fuel cartridge, comprising:
    an inlet manifold;
    a plurality of fuel beds containing a chemical hydride material, a first end of each of the fuel beds being coupled to the inlet manifold to receive hydrogen gas containing water vapor via the inlet manifold to react with the chemical hydride material to produce dry hydrogen gas;
    an outlet manifold coupled to a second end of each of the fuel beds to receive the dry hydrogen from the fuel beds; and
    wherein the fuel beds are laterally spaced from each other providing space for flow of coolant fluid therebetween to cool the fuel beds while the dry hydrogen is being produced.

2. The fuel cartridge of claim 1, wherein each of the plurality of fuel beds comprises a fiber reinforced polymer.

3. The fuel cartridge of claim 1, wherein the plurality of fuel beds are arranged in a rectangular staggered column array.

4. The fuel cartridge of claim 1, wherein the fuel cartridge includes a temperature sensor configured to determine a temperature associated with the fuel cartridge.

5. The fuel cartridge of claim 4, wherein the temperature sensor is configured to determine a temperature associated with an outer surface of the fuel cartridge.

6. The fuel cartridge of claim 4, wherein the temperature sensor is configured to determine a temperature associated with an interior of one of the plurality of fuel beds.

7. The fuel cartridge of claim 1, wherein the first end of each of the plurality of fuel beds includes a first gas-permeable filter supported between the input manifold and the fuel beds and wherein the second end of each of the plurality of fuel beds includes a second gas-permeable filter supported between the output manifold and the fuel beds.

8. The fuel cartridge of claim 1 and further comprising:
    a first valve disposed within an input of the inlet manifold; and
    a second valve disposed within an output of the outlet manifold.

9. The fuel cartridge of claim 8 wherein the first and second valves are configured to be in an open position in response to the fuel cartridge being operably coupled to an anode loop of a fuel cell based power generator and in a closed position in response to the fuel cartridge not being operably coupled to the anode loop.

10. The fuel cartridge of claim 8 wherein the first and second valves are iris valves.

11. A fuel cartridge, comprising:
an inlet valve;
a plurality of fuel beds containing a chemical hydride material;
an outlet valve;
wherein the fuel beds are spaced apart to facilitate flow of cooling fluid past the plurality of fuel beds, and
wherein each of the plurality of fuel beds is connected to the inlet valve to receive wet hydrogen gas containing water vapor via an inlet manifold and wherein each of the plurality of fuel beds is connected to the outlet valve to react with the chemical hydride material to provide dry hydrogen via an outlet manifold.

12. The fuel cartridge of claim 11 wherein the cooling mechanism includes a plurality of ducts, and wherein each of the plurality of fuel beds is separated from others of the plurality of fuel beds by at least one of the plurality of ducts.

13. The fuel cartridge of claim 11, wherein the cooling fluid comprises air.

14. The fuel cartridge of claim 11, wherein the fuel cartridge includes a heating mechanism configured to provide heat to the plurality of fuel beds.

15. The fuel cartridge of claim 11, and further comprising a cooling mechanism that includes a fan configured to provide the cooling fluid.

16. The fuel cartridge of claim 15, wherein the cooling mechanism includes a duct configured to direct airflow along the plurality of fuel beds.

17. A method, comprising:
containing a granular hydride material in a plurality of spaced apart fuel beds of a fuel cartridge;
inserting the fuel cartridge into a fuel cell based power generator o open valves associated with each of first and second ends of the fuel beds;
providing water vapor to the first end of each of the plurality of fuel beds, wherein hydrogen gas is generated by a respective reaction within each of the plurality of fuel beds to produce generated hydrogen gas;
passing the generated hydrogen gas out of the fuel cartridge; and
cooling the fuel beds by flowing coolant fluid past the outside of the spaced apart fuel beds.

18. The method of claim 17 and further comprising retaining the granular hydride material within the fuel beds via filters positioned at each of the first and second ends of the fuel beds.

19. The method of claim 17, wherein the method includes:
sensing a temperature of the fuel cartridge; and
controlling a cooling mechanism to maintain the temperature of the fuel cartridge.

* * * * *